(12) United States Patent
Eastlack

(10) Patent No.: US 9,218,048 B2
(45) Date of Patent: Dec. 22, 2015

(54) INDIVIDUALLY ACTIVATING OR DEACTIVATING FUNCTIONAL UNITS IN A PROCESSOR SYSTEM BASED ON DECODED INSTRUCTION TO ACHIEVE POWER SAVING

(71) Applicant: Jeffrey R. Eastlack, Austin, TX (US)

(72) Inventor: Jeffrey R. Eastlack, Austin, TX (US)

( * ) Notice: Subject to any disclaimer, the term of this patent is extended or adjusted under 35 U.S.C. 154(b) by 291 days.

(21) Appl. No.: 13/756,545

(22) Filed: Feb. 1, 2013

(65) Prior Publication Data

US 2014/0047258 A1  Feb. 13, 2014

Related U.S. Application Data

(60) Provisional application No. 61/594,369, filed on Feb. 2, 2012.

(51) Int. Cl.
    *G06F 1/32*  (2006.01)

(52) U.S. Cl.
    CPC .......... *G06F 1/3287* (2013.01); *G06F 1/3203* (2013.01); *G06F 1/3243* (2013.01); *Y02B 60/1239* (2013.01); *Y02B 60/1282* (2013.01)

(58) Field of Classification Search
    CPC ....... G06F 1/30; G06F 9/3822; G06F 11/141; G06F 8/66; G06F 9/30145; G06F 9/328; G06F 9/382; G06F 9/3851; G06F 9/4401; G06F 9/44505
    USPC ........................................................ 713/340
    See application file for complete search history.

(56) References Cited

U.S. PATENT DOCUMENTS

| | | | | |
|---|---|---|---|---|
| 5,196,728 | A  * | 3/1993 | Jaux ................... | B60R 16/0315 307/10.1 |
| 5,241,492 | A  * | 8/1993 | Girardeau, Jr. ............... | 708/523 |
| 5,815,724 | A  * | 9/1998 | Mates ........................... | 713/322 |
| 6,427,202 | B1 * | 7/2002 | Richardson et al. ............ | 712/32 |
| 6,785,761 | B2 * | 8/2004 | Lin ....................... | G06F 1/3203 712/E9.063 |
| 6,983,389 | B1 * | 1/2006 | Filippo ........................ | 713/324 |
| 7,266,707 | B2 | 9/2007 | Ngo et al. | |
| 7,447,923 | B2 | 11/2008 | Bose et al. | |
| 7,490,302 | B1 | 2/2009 | Rahman et al. | |
| 7,656,212 | B1 * | 2/2010 | Masleid ....................... | 327/276 |
| 7,868,479 | B2 | 1/2011 | Subramaniam | |
| 8,219,834 | B2 | 7/2012 | Basak et al. | |
| 2004/0078553 | A1 * | 4/2004 | Hussain ........................ | 712/214 |
| 2005/0251644 | A1 * | 11/2005 | Maher et al. ..................... | 712/2 |
| 2007/0043960 | A1 * | 2/2007 | Bose et al. ................... | 713/300 |
| 2007/0106914 | A1 * | 5/2007 | Muthukumar ........ | G06F 1/3203 713/300 |
| 2007/0250686 | A1 * | 10/2007 | Bhullar et al. ................ | 712/212 |
| 2008/0022080 | A1 * | 1/2008 | Craske ......................... | 712/225 |

(Continued)

*Primary Examiner* — Thomas Lee
*Assistant Examiner* — Santosh R Poudel
(74) *Attorney, Agent, or Firm* — Andrew Alia

(57) ABSTRACT

In an embodiment, a functional unit control system includes an instruction decoder of a processor comprising a pipeline, the instruction decoder being configured to decode an instruction to be performed by the processor. The system further includes a power controller unit coupled to the instruction decoder, and a functional unit which may operate during execution stages of the processor's pipeline coupled to the power controller unit and the instruction decode stage. The power controller unit is configured to determine whether the functional unit should be used to perform at least part of the instruction based on data of the instruction decoder. The power controller unit is further configured to perform at least one of activating and deactivating the functional unit in accordance with the determination of whether the functional unit should be used.

16 Claims, 12 Drawing Sheets

(56) References Cited

U.S. PATENT DOCUMENTS

| | | | |
|---|---|---|---|
| 2008/0106328 A1* | 5/2008 | Diamond | G06F 1/3203 327/544 |
| 2008/0313480 A1* | 12/2008 | Malhi et al. | 713/323 |
| 2009/0001814 A1* | 1/2009 | Subramaniam | 307/39 |
| 2009/0150651 A1* | 6/2009 | Ohmori | 712/28 |
| 2010/0268917 A1* | 10/2010 | Nation et al. | 712/208 |
| 2013/0124890 A1* | 5/2013 | Priel et al. | 713/320 |

* cited by examiner

| Clock Cycle | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Instruction | | | | | | | | | | | | | | | | | | |
| MUL R0, R4, R6 | IF | ID | M1 | M2 | M3 | M4 | M5 | M6 | M7 | MEM | WB | | | | | | | |
| MUL R1, R4, R8 | | IF | ID | ←—— | Waiting | on | FP_MUL | ——→ | | M1 | M2 | M3 | M4 | M5 | M6 | M7 | MEM | WB |
| Power Gating State | | | | | | | | | | | | | | | | | | |
| FP_MUL 202 | OFF | OFF | ON | ON | ON | ON | ON | ON | ON | ON | ON | ON | ON | ON | ON | ON | ON | OFF |
| FP_ADD 204 | OFF | OFF | OFF | OFF | OFF | OFF | OFF | OFF | OFF | OFF | OFF | OFF | OFF | OFF | OFF | OFF | OFF | OFF |
| FP_DIV 206 | OFF | OFF | OFF | OFF | OFF | OFF | OFF | OFF | OFF | OFF | OFF | OFF | OFF | OFF | OFF | OFF | OFF | OFF |
| INT 106 | OFF | OFF | OFF | OFF | OFF | OFF | OFF | OFF | OFF | OFF | OFF | OFF | OFF | OFF | OFF | OFF | OFF | OFF |

Non-Pipelined Units

FIG. 5

| | Clock Cycle | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Instruction | MUL R0, R4, R6 | IF | ID | M1 | M2 | M3 | M4 | M5 | M6 | M7 | MEM | WB | | | | |
| | ADD R2, R0, R8 | | IF | Stall | ID | Stall | Stall | Stall | Stall | Stall | A1 | A2 | A3 | A4 | ME | WB |
| Power Gating State | FP_MUL 202/302 | OFF | OFF | ON | ON | ON | ON | ON | ON | ON | OFF | OFF | OFF | OFF | OFF | OFF |
| | FP_ADD 204/304 | OFF | OFF | OFF | OFF | OFF | OFF | OFF | OFF | OFF | ON | ON | ON | ON | OFF | OFF |
| | FP_DIV 206/306 | OFF | OFF | OFF | OFF | OFF | OFF | OFF | OFF | OFF | OFF | OFF | OFF | OFF | OFF | OFF |
| | INT 106 | OFF | OFF | OFF | OFF | OFF | OFF | OFF | OFF | OFF | OFF | OFF | OFF | OFF | OFF | OFF |

Pipelined or Non-Pipelined Units

FIG. 6

INDIVIDUALLY ACTIVATING OR DEACTIVATING FUNCTIONAL UNITS IN A PROCESSOR SYSTEM BASED ON DECODED INSTRUCTION TO ACHIEVE POWER SAVING

CROSS REFERENCE TO RELATED APPLICATION

This application claims the benefit of U.S. Provisional Application No. 61/594,369, filed on Feb. 2, 2012, which is hereby incorporated by reference in its entirety.

BACKGROUND

Static power dissipation is quickly becoming the main component to the overall power consumption of the modern microprocessor or integrated circuit (IC). As we reduce horizontal feature size of the transistors we also reduce the vertical feature size. Transistors are built by the vertical layering of electrically dissimilar materials with extremely low and precise geometrical tolerances at the atomic scale. Some of the vertical slices are significantly thinner than the horizontal features. The gate oxide layer which separates charge between the gate from the p and n channels of the substrate can be measured by counting atoms of thickness. As this vertical scaling continues beyond 32 nm, the electric polarization field will continue to weaken and thus the gate oxide loses the ability to separate charge. Because of this, electrons have a less restricted flow. This results in increased static power or "leakage power," which is now becoming the dominant power loss as process technology continues to scale. Functional units (FUs) within a pipeline's execution stages account for a large percentage of the microprocessors "on chip" real-estate. The amount of leakage within a given process technology is largely proportional to the number of transistors on the die. As static leakage power dissipation continues to worsen as CMOS scaling continues, technologies that reduce or eliminate leakage power dissipation will be of paramount importance.

PRIOR ART

U.S. Pat. No. 7,868,479 ('479 patent), "Power gating for multimedia processing power management," pertains to a power management implementation designed to save power while driving a multimedia display. The '479 patent uses software based power gating control methods which permit very course grained power gating implementations, and which introduce power up latencies of hundreds of thousands of clock cycles. The method of the '479 patent may render a microprocessor useless.

U.S. Pat. No. 7,490,302 (the '302 patent), "Power gating various number of resources based on utilization levels," involves the use of programmable logic devices (PLD) such as a FPGA. The technology statically powers unused general purpose logic blocks within a programmable logic device during the programming phase.

U.S. Pat. No. 7,447,923 (the '923 patent), "Systems and methods for mutually exclusive activation of microprocessor resources to control maximum power," involves monitoring the maximum power threshold to invoke or power gate resources if the maximum power is below or above a specified threshold, respectively.

U.S. Pat. No. 7,266,707 (the '707 patent), "Dynamic leakage control circuit," involves power gating stages within a pipeline.

U.S. Pat. No. 8,219,834 (the '834 patent), "Predictive Power Gating with Optional Guard Mechanism," involves using an algorithm to predict units to power gate.

SUMMARY

Field of Invention

Example embodiments of this disclosure relate to fine grained power gating technology within a microprocessor's execution units. When a functional unit, such as, but not limited to, a floating point multiplier or divider is in an idle or stalled state, it may be power gated. A power controller unit 412 may be used to determine when functional units are needed by an instruction and then powers them up for the number of clock cycles that are needed to complete the operation. Instruction decoding may be used to implement the fine grained functional unit power gating within a processor pipeline's execution stages without any software level awareness, which adds the benefit of preserving existing software investments.

A modern high-end microprocessor may have more than a dozen functional units which operate during the execution stages of its pipeline. This plurality of functional units is included to provide an increase in instruction level parallelism during the execution of a program in order to increase the instruction execution throughput. In many cases, depending on the instruction stream of the program, many of these functional units remain in the idle state, in which they incur static leakage power dissipation. As a result, power dissipation in an integrated circuit or microprocessor reduces battery life and increases the temperature of the IC, which limits reliability and life of the IC.

An embodiment of a power gating pipeline control method detects when an instruction is about to be issued to a functional unit within the execution stages of a pipeline and then powers up the FU shortly before it is needed via the electronic switches 404, 406, 408, and 410, and then latching these switches for the appropriate duration of clock cycles as dictated by the requirements of the FUs as shown in FIG. 7.

This method eliminates dynamic and static power dissipation associated with that particular functional unit during the times that they are not needed by the instruction stream, as shown in the examples of FIG. 5 and FIG. 6. These examples show the cycle to cycle execution of the instructions, and how they correspond to the power states of the relevant FUs. In a preferred implementation, the FUs are power gated in all clock cycles except the clock cycles when FUs are needed.

In addition to power gating the FUs that are not being used, embodiments of the invention may allow designers to implement more aggressive superscalar implementations with a larger number of FUs, as this architecture will dynamically control the power state of these same FUs. As a result, power penalties associated with over designing the architecture for the rare instruction case may be dramatically reduced or eliminated. Hardware and software will have tighter coupling as the hardware's FUs in this invention disclosure will dynamically adapt to the software instructions on the fly. In short, this invention may provide relief to the power budget with a microprocessor implementation that uses less power, or may allow designers to develop more aggressive microprocessor implementations without exceeding the power budget.

BRIEF DESCRIPTION OF THE DRAWINGS

FIG. 5 shows the cycle to cycle power status of the non-pipelined FU's in FIG. 2 which is accomplished by the implementation of the proposed invention during the execution of two sequential example instructions.

FIG. 6 shows the possible cycle to cycle power status of the FUs in FIG. 2 and FIG. 3 during a read after write (RAW) data hazard and how the instruction decode stage may delay issue to the FU so that the stall state will not occur midflight resulting in a longer duration when power is enabled.

DETAILED DESCRIPTION

Figure 2:
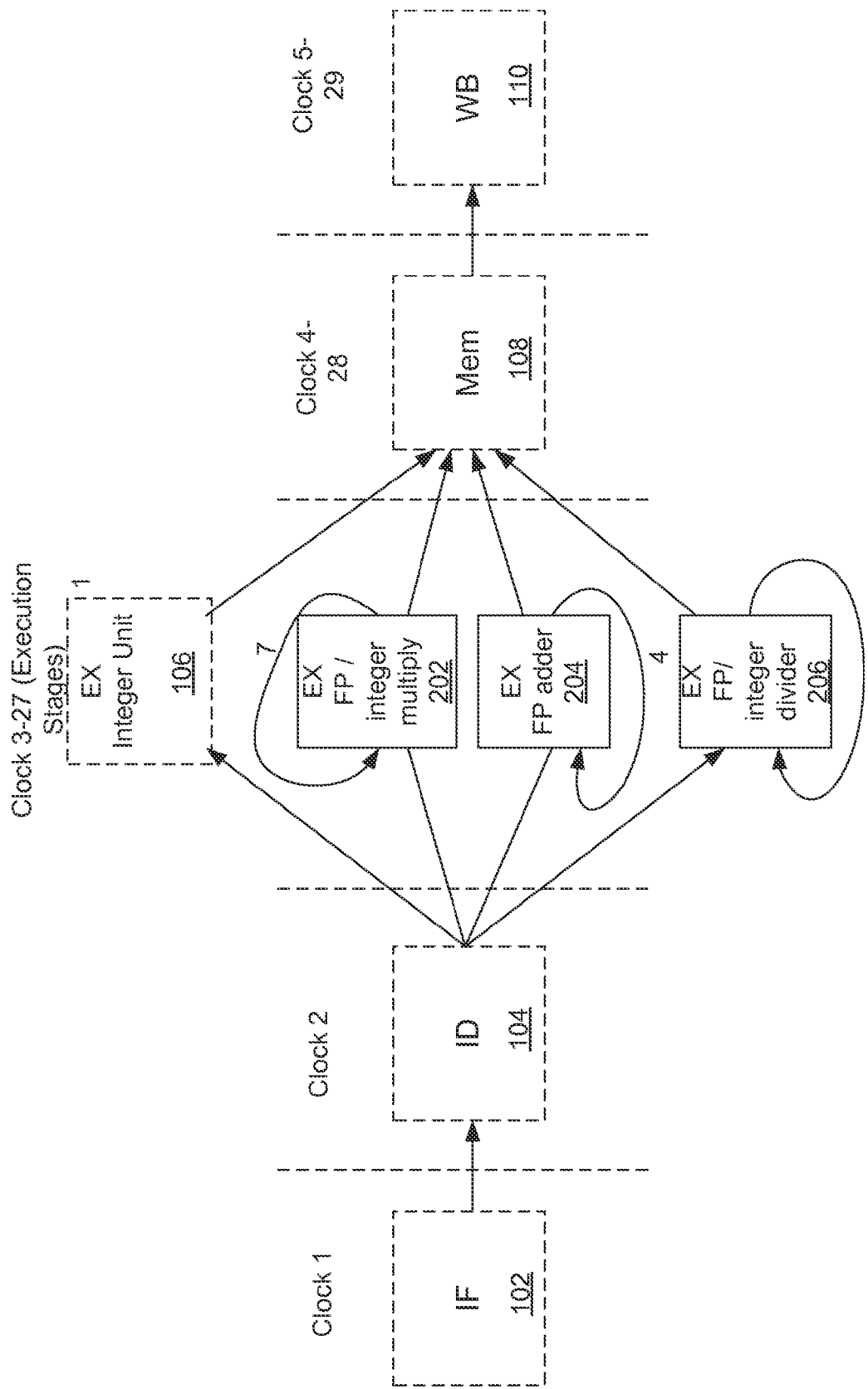
FIG. 2 shows an expansion of the classic five stage pipeline from FIG. 1 to support multi-cycle mathematical operations within the execution stages. In this case multi-cycle operations are looped back to the functional unit.
Figure 3:
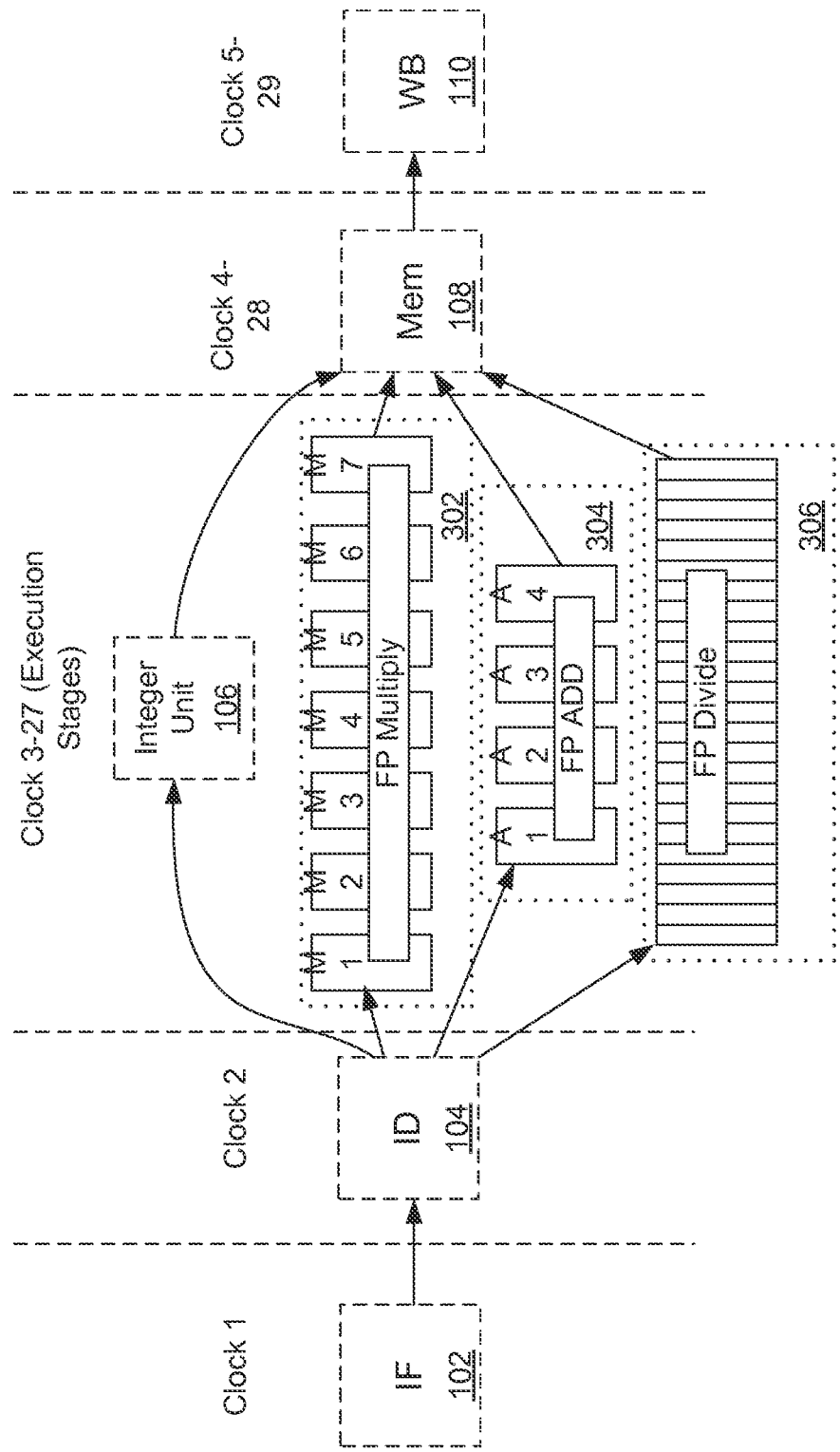
FIG. 3 shows an expanded version of the execution stages shown in FIG. 1 and FIG. 2 with pipelined FUs such as floating point multiply, add, and divide.

Many types of processor architectures currently exist and thus the details of the implementations can differ. However, the concept of power gating functional units ("FUs") within a processor's pipeline may be applied to any processor architecture that uses an instruction decoder and execution units, or a pipelined implementation. In a preferred embodiment, the system identifies which FUs within the execution stages of clocks 3-27 in FIG. 2 and FIG. 3, are going to be needed for a particular instruction. Once this is known, the power controller unit 412 which is shown in greater detail in FIG. 9 will apply power to the FU right before the instruction is issued to it, thus, eliminating static and dynamic power dissipation during idle periods.

Figure 1:
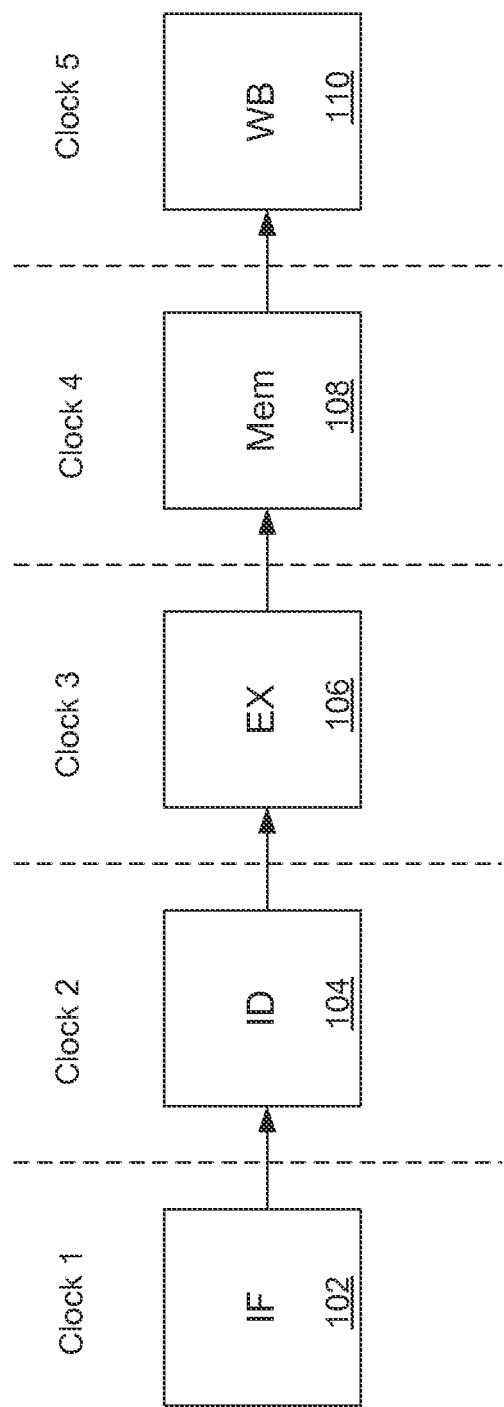
FIG. 1 shows a diagram of the classic five stage pipeline within a microprocessor.

The concept of pipelining was introduced commercially around the 1980's as a way to exploit instruction level parallelism with the execution of a sequential program. Operations to be performed on the instructions are broken down into stages that occur in succession. The instructions enter the pipeline in an assembly line fashion to effectively increase the throughput of completed instructions. FIG. 1 shows a classic five stage pipeline. The first stage of the pipeline is the instruction fetch (IF) stage 102, which among other things the current instruction is fetched from memory. Then second stage is the instruction decode (ID) stage 104 where decoding is done in parallel to register reads. The third stage is the execution stage (EX) 106, which is the focus of this invention disclosure and where the FUs that perform logic and mathematical operations reside within the pipeline's operational timeline. The fourth stage is a memory access 108 stage which applies to loads and stores and finally the write back stage 110 to registers.

FIG. 2 shows the expansion of the classic five stage pipeline to accommodate multi-cycle operations such as floating point math calculations. In this example, four FUs within the execution stage are described. The first is 106, which is the integer execution unit from the five stage pipeline of FIG. 1, this unit completes operations in 1 clock cycle. The second is the multiplier unit 202, which can handle both floating point and integer data values and complete the operation in 7 clock cycles. The third functional unit is the adder 204, which takes a total of 4 clock cycles to complete. The last functional unit in FIG. 2 is the divider 206, which can both handle floating point and integer data values and takes a total of 25 clock cycles to complete. As illustrated, the functional units within the execution stage are not pipelined.

FIG. 3 shows a pipelined version of the functional units of FIG. 2. With this implementation, the pipelined FUs are capable of executing one instruction per cycle at a cost of an increase in transistor count due to a limit on logic sharing and the pipeline registers that are placed in between stages. Modern superscalar microprocessors use a plurality of identical FUs with as many as four "like" integer and floating point FUs like 106, 302, 304, and 306. These FUs are included to provide high performance execution on a mix of different types of programs and applications. In most cases, it is an over design that comes with a penalty of both static and dynamic power consumption.

It is important to note that many ways and configurations to implement a processor's pipeline exist, the implementation shown in this disclosure is a simplified example that was chosen to convey the concept.

Figure 4:
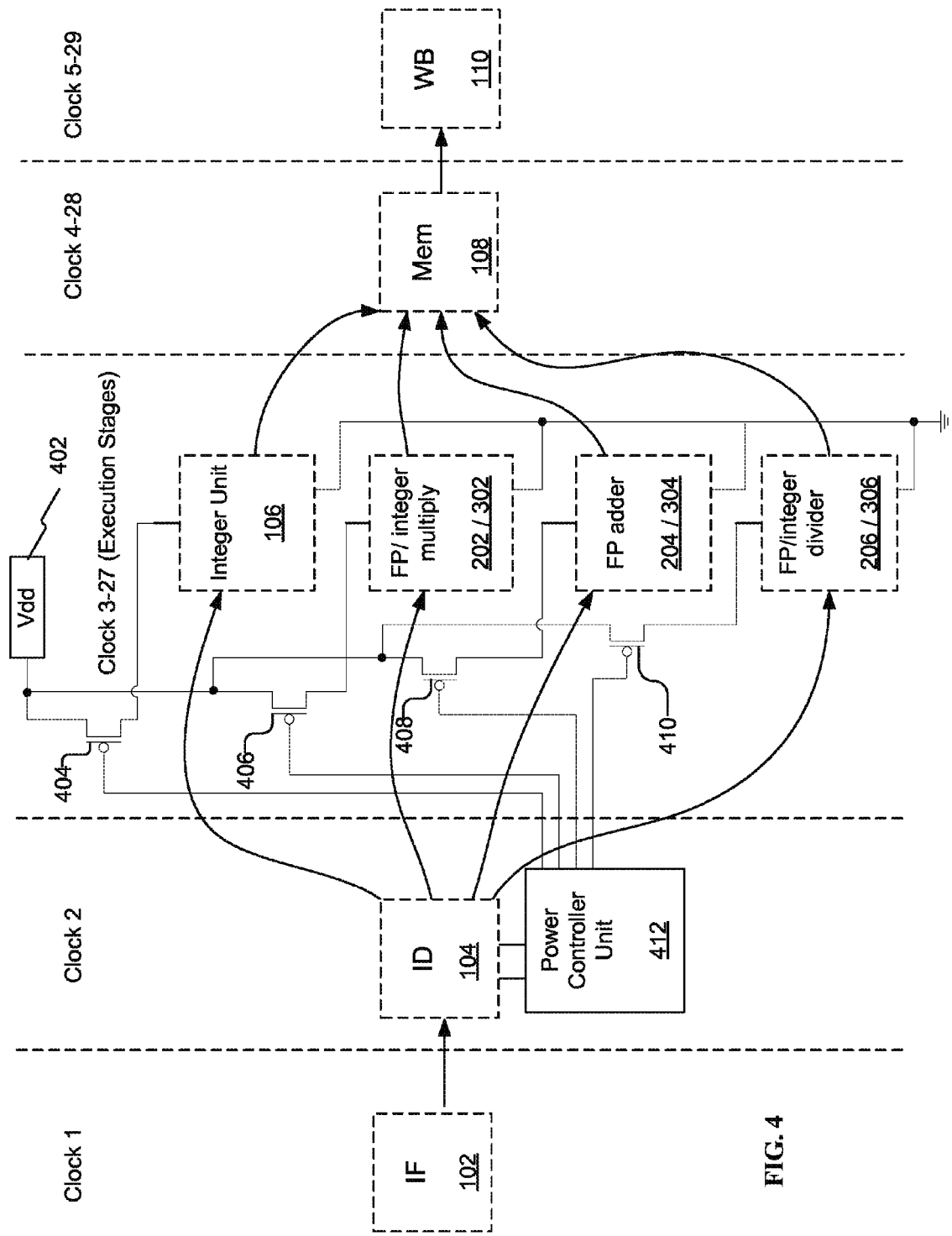
FIG. 4 introduces power gating circuitry to the pipeline's execution units. In this diagram a power controller unit is introduced to determine which functional unit will receive power depending on the decoded instruction.
Figure 8:
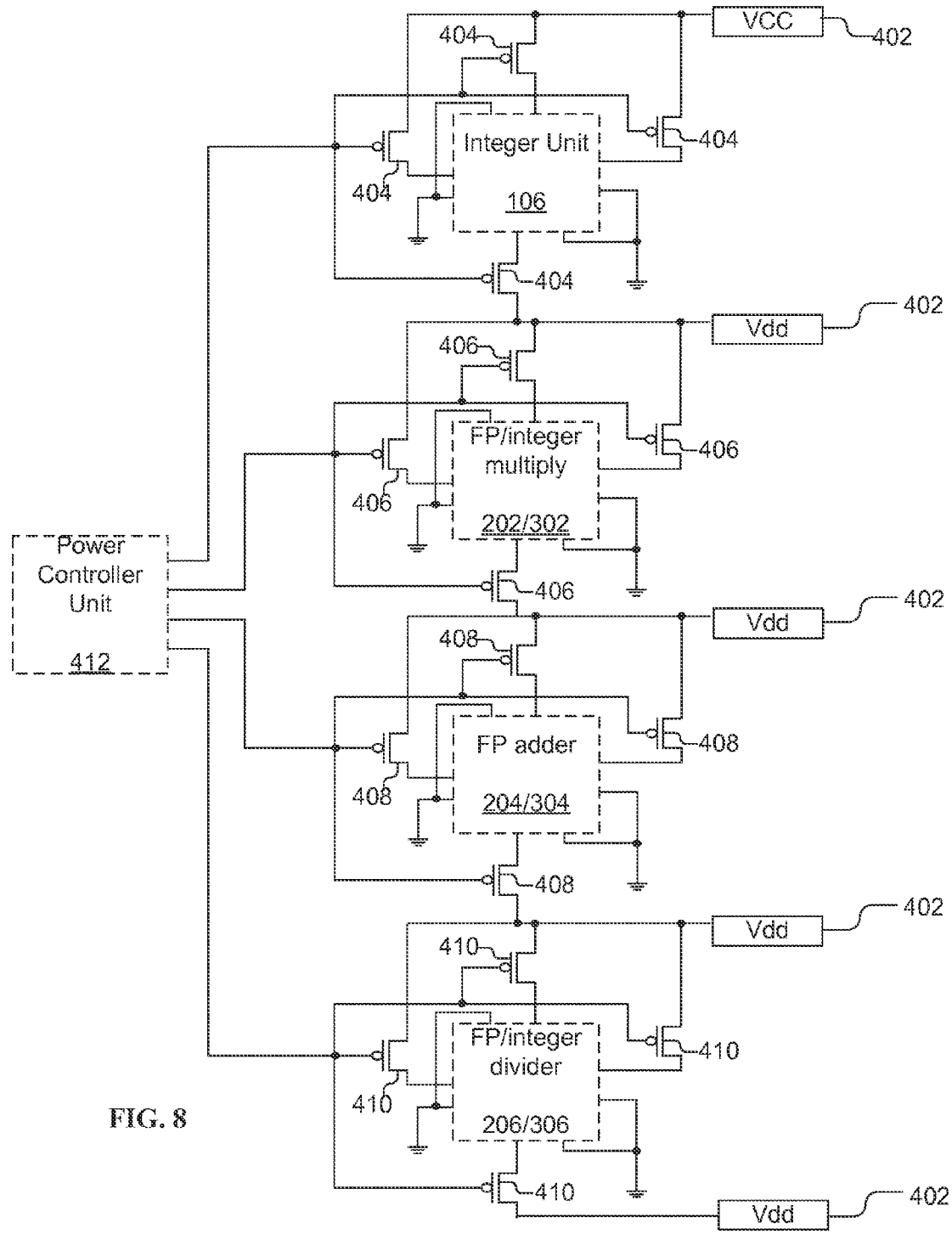
FIG. 8 show a higher performing power distribution scheme to allow improved power up latency to the functional units. It employs the use of a plurality of switches that allow power to the functional unit's power distribution fabric.
Figure 9:
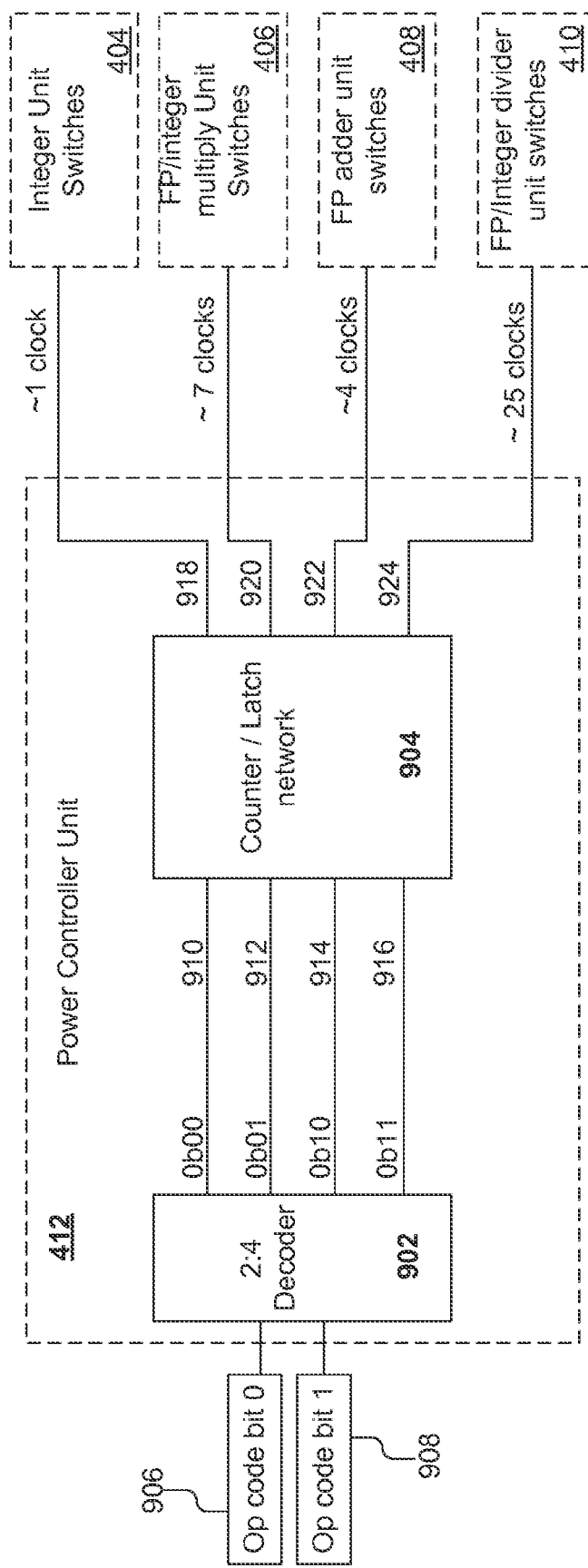
FIG. 9 shows an implementation of a power controller unit 412 which may be composed of a decoder and a counter/latching network.

The implementation shown in FIG. 4 describes how adding additional logic as shown in FIG. 9 to control the power switches 404, 406, 408, and 410 could be introduced as means to eliminate the dynamic and static power consumption of the FUs when they are not needed. The power controller unit 412 should be active in the pipeline before execution stages as shown in FIG. 4. The power controller unit 412 shown in FIG. 9 initiates the control switch to power any one of the FUs as shown in FIG. 5 and FIG. 6. The control switches 404, 406, 408, and 410 could be realized using many different transistor technologies such as a metal-oxide semiconductor (MOS) switch that has a wide enough channel to source enough current to the FU so that the powering up phase takes a limited amount of time. A power distribution network like the one shown in FIG. 8 may be used to limit the power up latency of the FUs so that the FU is available for use when it is immediately needed or by clock 3 which is the first clock of the execution stages in the example shown in this invention disclosure. The implementation in FIG. 8 shows the use of multiple power rails 402 that may be sourced by the FUs 106, 202/302, 204/304, and 206/306 via a plurality of corresponding power switches 404, 406, 408, and 410 with a proportional number of ground terminals. The plurality of these power rails may help compensate for the power up latency associated with the parasitic capacitance of the transistors in the FU.

In either case, power up timing should be considered and look-ahead logic and the uses of wait states may be needed to initiate power to the FUs by more than one clock cycle before they are needed. Higher performing power distribution networks like the one in FIG. 8 should be considered to minimize power up latency.

The power controller unit 412 may work in conjunction with the instruction decoder so that together they conspire to ensure that the 1) instruction is issued to the proper FU, 2) FU will be powered on in time, 3) FU will be powered on for the minimum number of clock cycles needed to execute the instruction. The power controller unit 412 may be easily realized by using a simple mix of shifters, latches, decoders and other standard logic blocks as shown in FIG. 9. The power controller unit may be composed of a 2:4 decoder 902 that takes bits from the instructions op-code 906 and 908 to determine the corresponding functional unit to enable. The 2:4 decoder 902 maps the 2 bit op-code 0b00, 0b01, 0b10 and 0b11 to one of a possible four signals 910, 912, 914, and 916 respectively. These signals then map to inputs on a counter latching unit 904 which then enables power switches 404, 406, 408, and 410 for a specific number of clock cycles which is predetermined by the operation of the particular FU. The counter latching unit 904 may be composed of standard shifters and latches.

Figure 7:
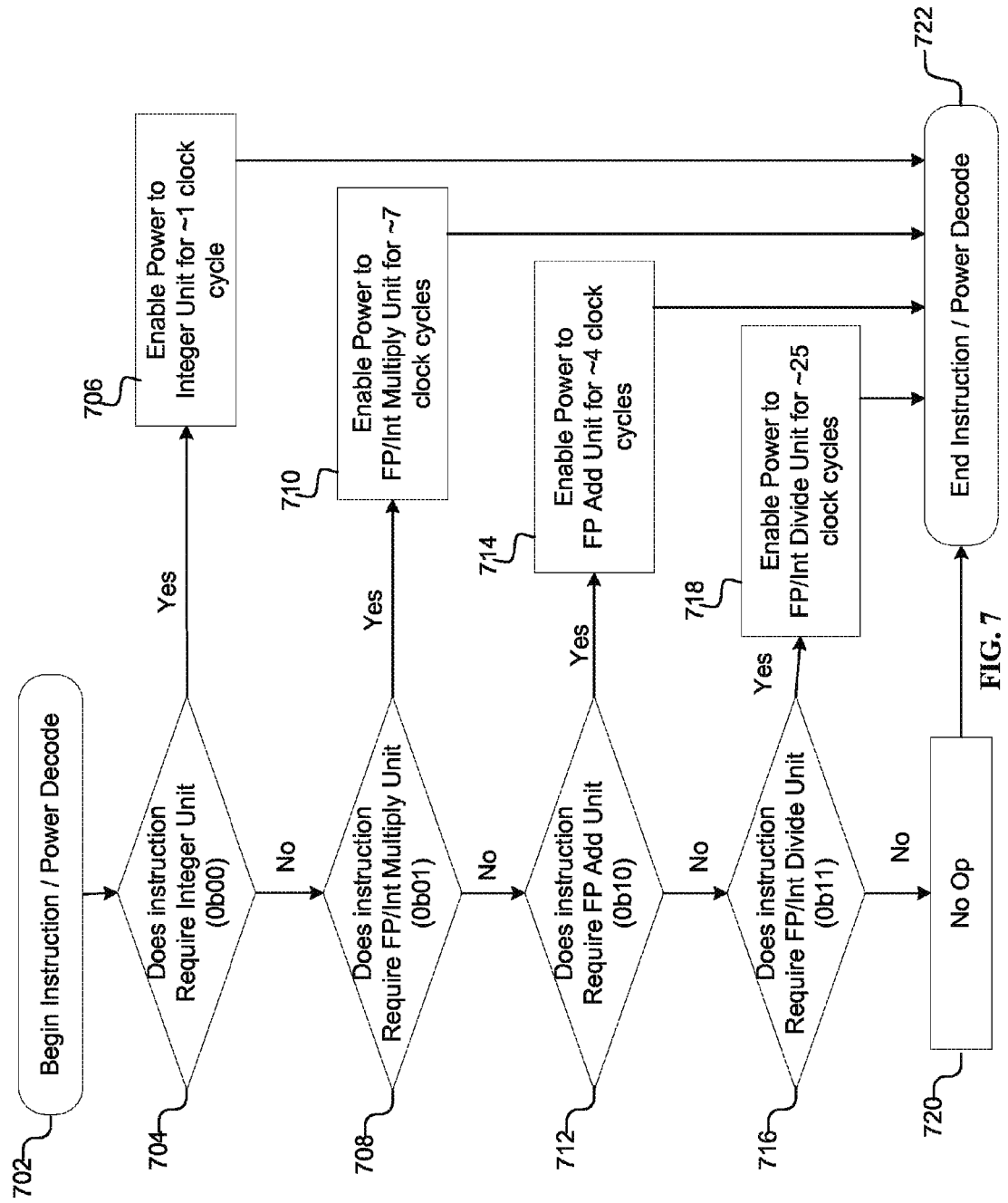
FIG. 7 shows a logical flow diagram for the power controller unit and instruction decoder to determine which functional units need to be enabled for the given instruction. The power to the functional unit will be available for a specific duration of time which is determined by the needs of the functional unit.

With the implementation shown in FIG. 9 and FIG. 7, op-code bits 0b00 correspond to the integer unit 106, whereas op-code bits 0b01, 0b10 and 0b11 correspond to FUs 202/302, 204/304, and 206/306 for clock cycle durations 1, 7, 4, and 25 respectively. It may be possible to use the decoding logic of the instruction decode unit 104 so that duplicate logic and function are not implemented.

The instruction decoding and power controller functionality is described in FIG. 7. To begin the operation 702 the instruction is check in step 704 to determine if it requires the use of the integer unit 106. If the instruction requires the use of the integer unit then the power controller unit will enable power to the integer unit 106 via switch 404 which is fed by signal 918 for approximately 1 clock cycle as shown in step 706. If the integer unit 106 is not needed by the instruction then the instruction will be checked to see if it is needed by the FP integer multiply unit 202/302 where the unit will be enabled as shown in 710 via switch 406 which is fed by signal 920 for approximately 7 clock cycles if it is needed by the instruction. The process repeats for instructions using the FP Adder 204/304 and FP integer divider 206/306 via switches 408 and 410 which is fed by signal 922 and 924 using the checks in steps 712 and 716 for approximately 4 or 25 clock cycles. The required number of clock cycles for each FU 106, 202/302, 204/304, and 206/306 may increase due to the introduction of wait states which may be required if the power distribution network is of lower performance.

It is important to understand that the flow process in FIG. 7 describes a sequential checking and enabling process for the purpose of explaining the concept, however in practice it should be implemented using standard decoding logic as shown in FIG. 9 to decrease power up latency so that no wait states are required.

FIG. 5 shows a simple sequence of multiply instructions (MUL) as they enter the execution stages of the pipeline of FIG. 2. In this implementation the FUs are not pipelined as a means to conserve die space and power at a cost of performance. This example was include to illustrate the status of the other FUs in the EX stage. The two multiply instructions (MUL) are to be executed in sequence, however the second MUL instruction is decoded and ready for issue at clock cycle number 4 but must wait until the first MUL instruction exits the multiplier unit 202. By using the power gating method proposed in this invention disclosure, the static and dynamic power dissipation that would normally occur is eliminated as shown in the bottom of FIG. 5 where the cycle to cycle on/off power state of each FU is displayed.

The ideal implementation would have stall cycles resolved before instruction issue so that any stall cycles would not occur in "mid-flight" where the instruction is in between execution stages of the function unit. This scenario is shown in FIG. 6 with an example of a data dependency with the last of the two instructions using the MIPS instruction set in which a read after write (RAW) pipeline hazard is introduced. In the instruction "MUL R0, R4, R6" the data values in registers R4 and R6 are multiplied and placed in register R0. The second instruction "ADD R2, R0, R8" requires the new data value for register R0 that is generated by the preceding instruction. Thus, due to this pipeline hazard a series of stalls must occur before the data in register R0 is available for the ADD instruction to execute through the floating point adder unit of 204 or 304 as shown in clock cycles 5-9 of FIG. 6. The pipeline's hazard detection logic could be augmented to stall the instruction from being issued to whichever FU that would incur the stall during the execution sequence. The idea is to stall the instruction before it is issued to the FU, instead of stalling the FU during its execution, which would prolong the time duration that the FU is powered. Some pipeline implementations do this already which would make the addition of the power controller unit a simpler task.

The examples shown in FIG. 5 and FIG. 6 illustrate the benefit from this type of power gating logic. In practice, and depending on the application, instructions such as floating point divide may be relatively rare. However, they do occur, and as such, floating point divide units such as 206 and 306 are implemented in hardware to support this relatively rare instruction. As a result the floating point divider is usually in an idle state where it is dissipating static and dynamic power.

The examples in FIG. 5 and FIG. 6 ignore the use of any wait states that may need to be introduced to compensate for any power up latency of the FU.

The benefits of the proposed technology can be visually seen by the cycle to cycle power status matrix in FIG. 5 and FIG. 6. In the corresponding code examples using an in-order executing pipeline, the technology keeps unused FUs in a powered down state. The energy savings for a given process technology will be proportional to the number of transistors in each FU and the time that it is in the off state.

Implementations that use pipelined FUs will see more dramatic power improvements as they use more transistors than non-pipelined FUs. In addition, his concept could be augmented to support multiple instances of the same FU and a programmable power management setting could be stored in a register to determine whether or not to include multiple identical instances of the same FU. For example a pipeline may have the ability to support three floating point adder units 204 or 304, however during periods where the computing device is running on battery power the power controller unit 412 may only power up one floating point adder units as a means to conserve power.

Figure 10:
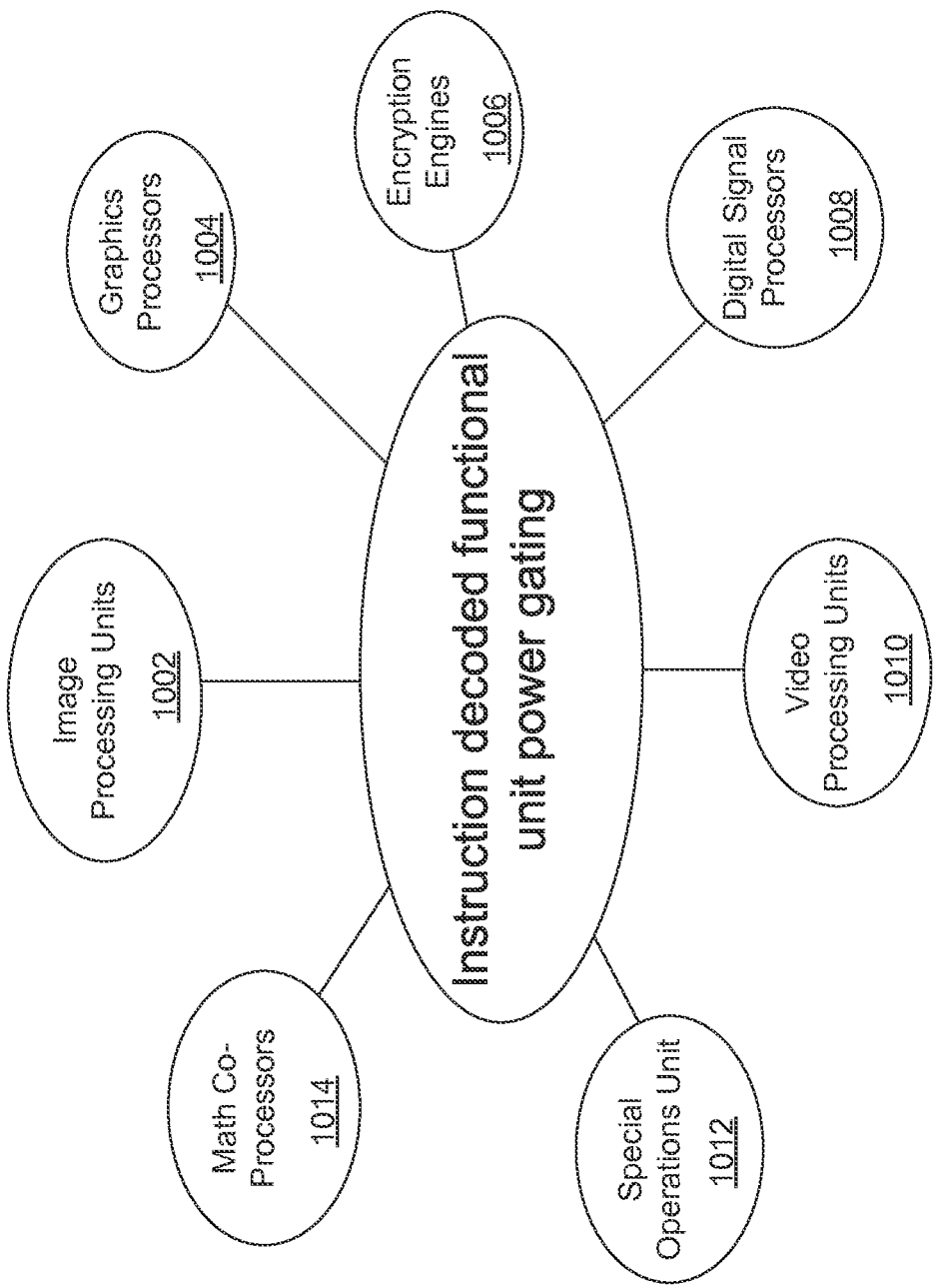
FIG. 10 shows how the concept of fine grained power gating via instruction decoding could be implemented into other special purpose processors and accelerators.

Fine grained power gating implementations such as this may also be used in within various other special purpose processors and accelerators such as shown in FIG. 10.

Figure 11:
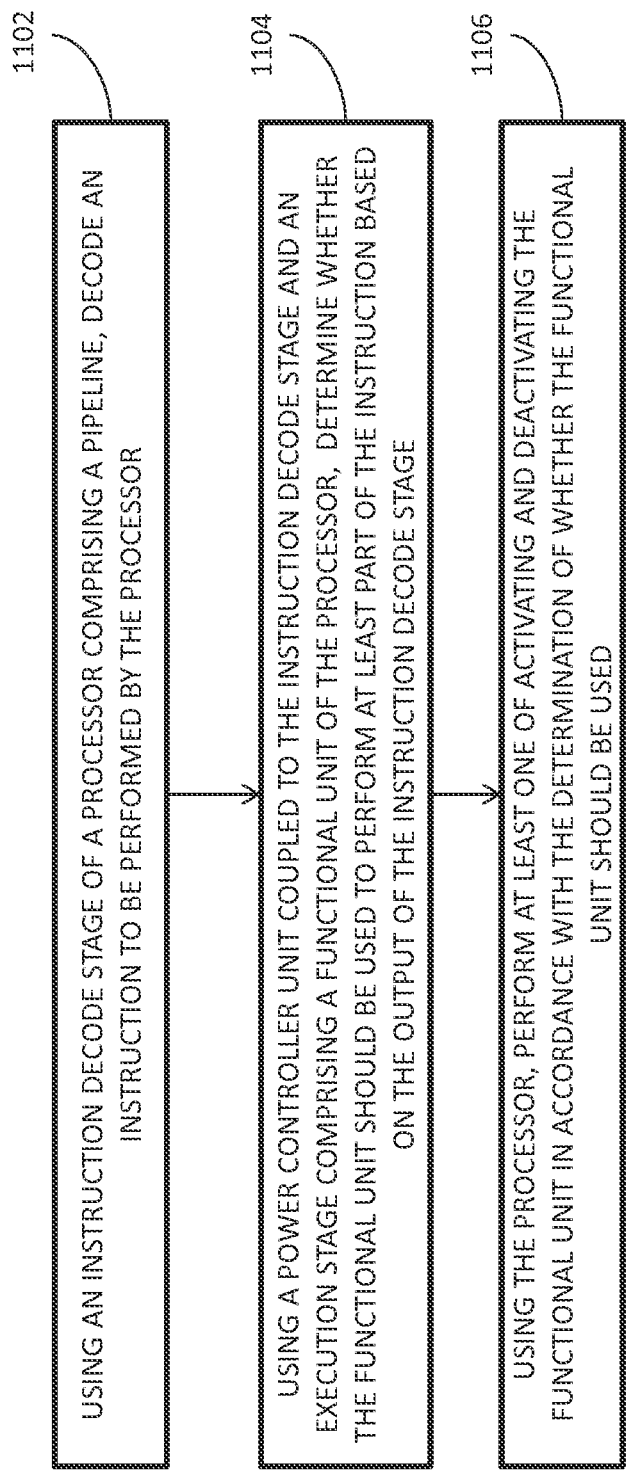
FIG. 11 is a process flow for controlling a functional unit, according to an embodiment.

FIG. 11 is a process flow for controlling a functional unit, according to an embodiment. In operation 1102, an instruction decoder of a processor comprising a pipeline is used to decode an instruction to be performed by the processor. In operation 1104, a power controller unit coupled to the instruction decode stage and an execution stage comprising a functional unit of the processor is used to determine whether the functional unit should be used to perform at least part of the instruction based on data of the instruction decode stage. In operation 1106, the processor is used to perform at least one of activating and deactivating the functional unit in accordance with the determination of whether the functional unit should be used.

Figure 12:
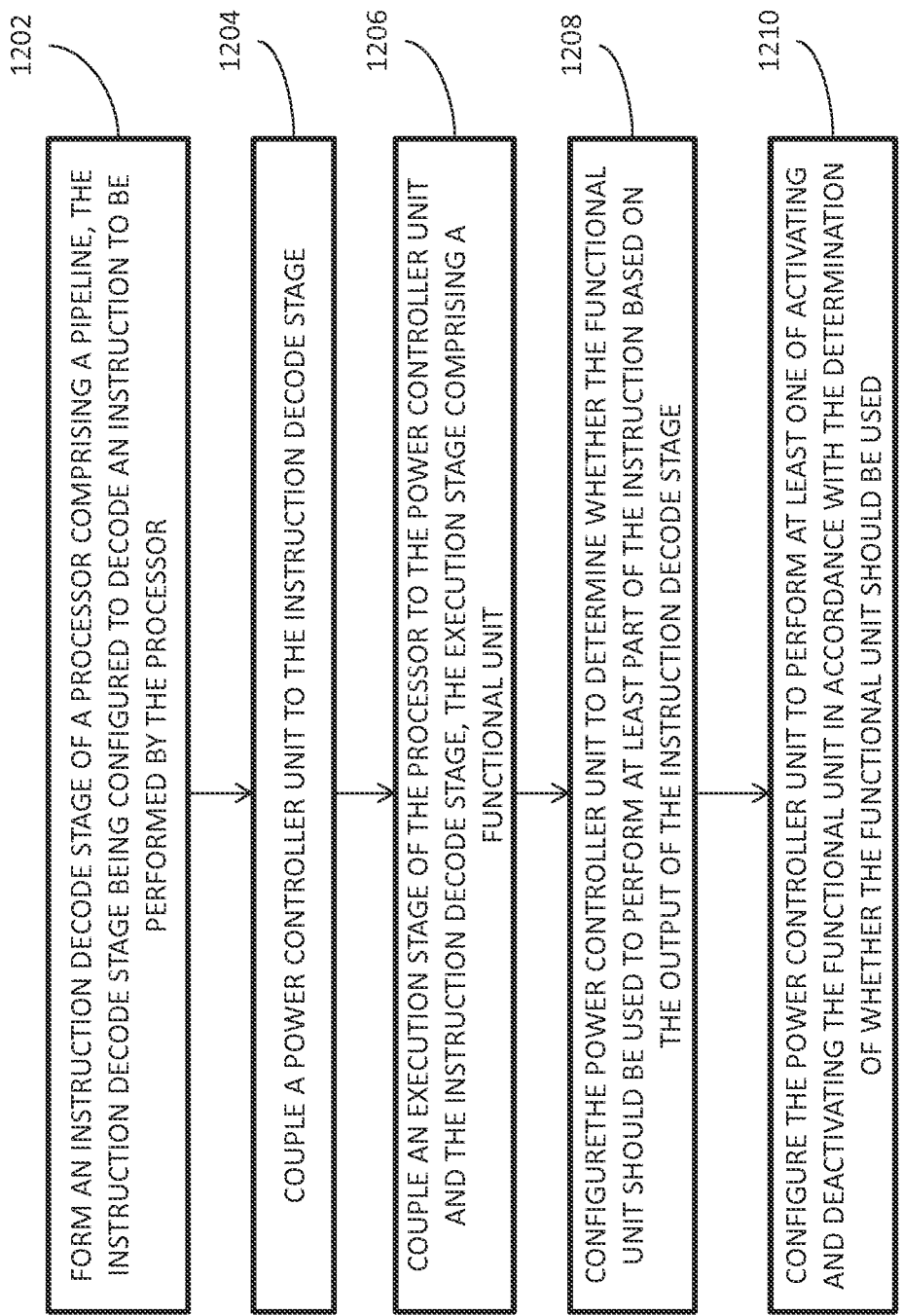
FIG. 12 is a process flow for configuring a system to control a functional unit, according to an embodiment.

FIG. 12 is a process flow for configuring a system to control a functional unit, according to an embodiment. In operation 1202, an instruction decoder of a processor is formed, the instruction decoder being configured to decode an instruction to be performed by the processor. In operation 1204, a power controller unit is coupled to the instruction decoder. In operation 1206, functional unit of the processor is coupled to the power controller unit and the instruction decoder. In operation 1208, the power controller unit is configured to determine whether the functional unit should be used to perform at least part of the instruction based on data of the instruction decoder. In operation 1210, the power controller unit is configured to perform at least one of activating and deactivating the functional unit in accordance with the determination of whether the functional unit should be used.

In an embodiment, a functional unit control system includes an instruction decoder of a processor, the instruction decoder being configured to decode an instruction to be performed by the processor. The system further includes a power controller unit coupled to the instruction decoder, and a functional unit of the execution stage of the processor coupled to the power controller unit and the instruction decoder. The power controller unit is configured to determine whether the functional unit should be used to perform at least part of the instruction based on data of the instruction decoder. The power controller unit is further configured to perform at least one of activating and deactivating the functional unit in accordance with the determination of whether the functional unit should be used.

The processor may be configured to operate using a pipeline, the instruction decoder may operate during an instruction decode stage of the pipeline, and the functional unit, when activated and used to perform at least part of the instruction, may operate during an execution stage of the pipeline.

The functional unit may be one of an integer unit, a floating point multiply unit, a floating point add unit, and a floating point divide unit. The functional unit may be any pipelined or non-pipelined functional unit. The system may further include a switch. The power controller unit and the functional unit may be coupled together via the switch. The logic in the instruction decode stage of the processor may be configured to stall an instruction to the functional unit of the execution stages until the functional unit has been activated.

The functional unit control system may further include a decoder configured to receive data of the instruction decoder, and a counter coupled to the decoder and configured to control a limited duration that the functional unit stays powered after being activated. The power controller unit may be configured to keep the functional unit powered for a limited duration after being activated.

The limited duration may correspond to the time needed for the functional unit to complete its function. The functional unit may be prevented from incurring static power loss or dynamic power loss when deactivated.

The functional unit control system may further include a plurality of switches coupled between the power controller unit and the functional unit. The plurality of switches may be configured to limit a power up latency of the functional unit.

In an embodiment, a functional unit control method includes, using an instruction decoder of a processor comprising a pipeline, decoding an instruction to be performed by the processor. The method further includes, using a power controller unit coupled to the instruction decoder and an functional unit operating in the execution stages of the processor, determining whether the functional unit should be used to perform at least part of the instruction based on data of the instruction decoder. The method also includes, using the processor, performing at least one of activating and deactivating the functional unit in accordance with the determination of whether the functional unit should be used.

The processor may be configured to operate using a pipeline, the instruction decoder may operate during an instruction decode stage of the pipeline, and the functional unit, when activated and used to perform at least part of the instruction, may operate during an execution stage of the pipeline.

The functional unit may be one of an integer unit, a floating point multiply unit, a floating point add unit, a floating point divide unit, a branch unit, a load unit, a store unit, and any other functional unit that may be pipelined. The processor may include a switch. The power controller unit and the functional unit may be coupled together via the switch.

The method may further include stalling an instruction to the functional unit until the functional unit has been activated. The method may also include receiving an output of the instruction decoder via a decoder, and using a counter coupled to the decoder, controlling a limited duration that the functional unit stays powered after being activated. The method may also include keeping the functional unit powered for a limited duration after being activated.

The limited duration may correspond to the time needed for the functional unit to complete its function. The functional unit may be prevented from incurring static power loss or dynamic power loss when deactivated.

The method may further include limiting a power up latency of the functional unit by accelerating in-rush current by using a plurality of switches coupled between the power controller unit and the functional unit.

In an embodiment, a method of forming a functional unit control system includes forming an instruction decoder of a processor comprising a pipeline. The instruction decode stage may be configured to decode an instruction to be performed by the processor. The method may further include coupling a power controller unit to the instruction decoder, and coupling a functional unit of the execution stages of the processor to the power controller unit and the instruction decoder, the execution stage comprising a functional unit. The method may also include configuring the power controller unit to determine whether the functional unit should be used to perform at least part of the instruction based on data of the instruction decoder. The method may further include configuring the power controller unit to perform at least one of activating and deactivating the functional unit in accordance with the determination of whether the functional unit should be used. The functional unit may be one of an integer unit, a floating point multiply unit, a floating point add unit, a floating point divide unit, a branch unit, a load unit, a store unit, and any other type of functional unit that may or may not be pipelined.

Although the invention has been described using specific terms, devices, and/or methods, such description is for illustrative purposes of the preferred embodiment(s) only. Changes may be made to the preferred embodiment(s) by those of ordinary skill in the art without departing from the scope of the present invention, which is set forth in the following claims. In addition, it should be understood that aspects of the preferred embodiment(s) generally may be interchanged in whole or in part.

What is claimed is:

1. A functional unit control system comprising:
an instruction decoder of a processor, the instruction decoder being configured to decode an instruction to be performed by the processor;
a power controller unit coupled to the instruction decoder; and
a first functional unit of the processor coupled to the power controller unit and the instruction decoder;
a plurality of switches, the power controller unit and the first functional unit being coupled together via the switches configurable to improve the power up latency to the functional unit via accelerating in-rush current;
wherein the power controller unit is configured to determine whether the first functional unit should be used to perform at least part of the instruction based on data of the instruction decoder;
wherein the power controller unit is further configured to perform at least one of activating and deactivating the functional unit in accordance with the determination of whether the functional unit should be used, and the functional unit is powered on for the minimal number of clock cycles needed to execute the instruction; and,
wherein the first functional unit is prevented from incurring static power loss and dynamic power loss when deactivated.

2. The functional unit control system of claim 1, further comprising a plurality of second functional units that are pipelined with the first functional unit.

3. The functional unit control system of claim 1, further comprising
a plurality of second functional units that are pipelined together, the plurality of second functional units being the same type as the first functional unit
wherein the first functional unit is non-pipelined.

4. The functional unit control system of claim 1, wherein the first functional unit type is one or more of an integer unit, a floating point multiply unit, a floating point add unit, a floating point divide unit, a branch unit, a load unit, and a store unit.

5. The functional unit control system of claim 1, wherein the processor is configured to stall an instruction to the first functional unit until the first functional unit has been activated.

6. The functional unit control system of claim 1, wherein the power controller unit is configured to keep the first functional unit powered for a limited duration after being activated, wherein the limited duration corresponds to the time needed for the first functional unit to complete its function.

7. The functional unit control system of claim 1, further comprising a plurality of switches coupled between the power controller unit and the first functional unit, the plurality of switches being configured to limit a power up latency of the first functional unit.

8. The functional unit control system of claim 1, wherein the power controller unit is also configured to determine whether the first functional unit should be used to perform the instruction based on whether one of performance and power conservation is being prioritized.

9. A functional unit control system comprising:
an instruction decoder of a processor, the instruction decoder being configured to decode an instruction to be performed by the processor;
a power controller unit coupled to the instruction decoder; and
a first functional unit of the processor coupled to the power controller unit and the instruction decoder;
a switch, the power controller unit and the first functional unit being coupled together via the switch;
a decoder configured to receive a relevant op-code bits during the instruction decode stage;
a counter coupled to the decoder and configured to control a limited duration that the first functional unit stays powered after being activated;
wherein the power controller unit is configured to determine whether the first functional unit should be used to perform at least part of the instruction based on data of the instruction decoder;
wherein the power controller unit is further configured to perform at least one of activating and deactivating the functional unit in accordance with the determination of whether the functional unit should be used, and the functional unit is powered on for the minimal number of clock cycles needed to execute the instruction; and,
wherein the first functional unit is prevented from incurring static power loss and dynamic power loss when deactivated.

10. The functional unit control system of claim 9, further comprising a plurality of second functional units that are pipelined with the first functional unit.

11. The functional unit control system of claim 9, further comprising
a plurality of second functional units that are pipelined together, the plurality of second functional units being the same type as the first functional unit
wherein the first functional unit is non-pipelined.

12. The functional unit control system of claim 9, wherein the first functional unit type is one or more of an integer unit, a floating point multiply unit, a floating point add unit, a floating point divide unit, a branch unit, a load unit, and a store unit.

13. The functional unit control system of claim 9, wherein the processor is configured to stall an instruction to the first functional unit until the first functional unit has been activated.

14. The functional unit control system of claim 9, wherein the power controller unit is configured to keep the first functional unit powered for a limited duration after being activated, wherein the limited duration corresponds to the time needed for the first functional unit to complete its function.

15. The functional unit control system of claim 9, further comprising a plurality of switches coupled between the power controller unit and the first functional unit, the plurality of switches being configured to limit a power up latency of the first functional unit.

16. The functional unit control system of claim 9, wherein the power controller unit is also configured to determine whether the first functional unit should be used to perform the instruction based on whether one of performance and power conservation is being prioritized.

* * * * *